United States Patent [19]

Urbanczyk

[11] Patent Number: 5,390,752

[45] Date of Patent: Feb. 21, 1995

[54] DRIVE TRAIN SUSPENSION SYSTEM
[75] Inventor: Marvin L. Urbanczyk, White Deer, Tex.
[73] Assignee: Scarab Manufacturing and Leasing, Inc., White Deer, Tex.
[21] Appl. No.: 41,319
[22] Filed: Mar. 31, 1993
[51] Int. Cl.⁶ .......................................... B62D 55/116
[52] U.S. Cl. .................................... 180/9.52; 180/41; 280/6.12
[58] Field of Search ................... 180/9.1, 9.5, 41, 9.52; 280/840, 6.1, 6.11, 6.12, DIG. 1, 43, 43.24, 781, 783, 797, 800

[56] References Cited

U.S. PATENT DOCUMENTS

| | | |
|---|---|---|
| 29,116 | 7/1860 | White et al. |
| 38,829 | 6/1863 | Johnson . |
| 905,985 | 12/1908 | Clove . |
| 1,658,093 | 2/1928 | Nygoard ................ 280/11.18 X |
| 1,749,298 | 3/1930 | Orafsik . |
| 2,108,128 | 2/1938 | Kinney . |
| 2,130,641 | 9/1938 | Grubb . |
| 2,150,964 | 3/1939 | Dornseif . |
| 2,242,870 | 5/1941 | Prosey . |
| 2,693,162 | 11/1954 | Poche . |
| 2,919,926 | 1/1960 | Schwarz ................... 280/840 |
| 2,988,369 | 6/1961 | Rebicek . |
| 3,026,118 | 3/1962 | Pare ..................... 280/7.13 X |
| 3,231,036 | 1/1966 | Appenrodt ................ 180/6.5 |
| 3,430,790 | 3/1969 | Beltrami .................. 180/41 |
| 3,528,678 | 9/1970 | Moulton .................. 280/781 |
| 3,658,146 | 4/1972 | Trivero ................... 180/9.52 |
| 3,924,704 | 12/1975 | Lindblom et al. .......... 280/6.12 |
| 3,947,050 | 3/1976 | Isely . |
| 4,074,909 | 2/1978 | Baikie . |
| 4,104,048 | 8/1978 | Urbanczyk .................. 71/9 |
| 4,131,288 | 12/1978 | Wilson . |
| 4,139,209 | 2/1979 | Humphreys . |
| 4,163,578 | 8/1979 | Watson ................... 280/781 |
| 4,218,069 | 8/1980 | Baikie . |
| 4,223,900 | 9/1980 | Olivieri . |
| 4,306,686 | 12/1981 | Urbanczyk ............... 241/101.7 |
| 4,379,563 | 4/1983 | Arsenault . |
| 4,932,675 | 6/1990 | Olson et al. |
| 4,977,971 | 12/1990 | Crane, III et al. ............ 180/8.3 |
| 4,995,774 | 2/1991 | Nusbaum .................. 280/43.24 |
| 5,088,749 | 2/1992 | Olivieri . |
| 5,110,153 | 5/1992 | Kallansrude et al. .......... 180/41 |
| 5,248,156 | 9/1993 | Cann et al. ................ 280/11.12 X |
| 5,332,242 | 7/1994 | Cann et al. ................ 280/11.18 |

FOREIGN PATENT DOCUMENTS

| | | |
|---|---|---|
| 163636 | 7/1915 | Canada . |
| 166373 | 11/1915 | Canada . |
| 239918 | 5/1924 | Canada . |
| 380906 | 4/1939 | Canada . |
| 386541 | 1/1940 | Canada . |
| 428202 | 6/1945 | Canada . |
| 637948 | 3/1962 | Canada . |
| 1053278 | 4/1979 | Canada . |
| 1072944 | 3/1980 | Canada . |
| 269583 | 3/1913 | Germany . |
| 724488 | 7/1942 | Germany . |
| 759294 | 5/1943 | Germany . |
| 313056 | 12/1933 | Italy . |
| 223321 | 9/1942 | Switzerland . |
| 3105 | of 1911 | United Kingdom . |
| 953308 | 3/1964 | United Kingdom ....... 280/11.18 |
| 2050845 | 1/1981 | United Kingdom . |
| 8400501 | 2/1984 | WIPO ..................... 280/7.13 |
| 9009817 | 9/1990 | WIPO . |

*Primary Examiner*—Karin L. Tyson
*Assistant Examiner*—Anne Marie Boehler
*Attorney, Agent, or Firm*—Brady, O'Boyle & Gates

[57] ABSTRACT

A drive train suspension system for a manure and compost treating vehicle wherein a linkage assembly is connected between the vehicle drive train assembly and the vehicle frame, on each side of the vehicle frame, so that the vehicle frame is articulately connected to a vehicle drive train assembly on each side. Fluid motors are connected between the vehicle frame and each drive train assembly so that the position of the vehicle frame relative to the drive train assembly can be selectively varied to thereby minimize potential damaging stress imparted to the drive train assembly by the lateral movement of the drive train relative to the vehicle frame, and to raise the vehicle frame to a selected elevation above the ground and/or maintain the vehicle frame substantially level. A stabilizing link assembly is connected between each drive train assembly and vehicle frame so that potential damaging stress imparted to the drive train assembly by the forward and rearward shifting of the drive train assembly relative to the vehicle frame is minimized.

24 Claims, 12 Drawing Sheets

DRIVE TRAIN SUSPENSION SYSTEM

BACKGROUND OF THE INVENTION

Manure and compost treating vehicles are disclosed in Applicant's U.S. Pat. Nos. 4,104,048 and 4,306,686, wherein a rotary drum, having a plurality of flails or blades distributed over the peripheral surface thereof, is mounted in a frame having ground engaging, power driven, wheels whereby the vehicle can be driven over the ground so that the flails on the rotary drum can agitate or disintegrate the straddled manure or compost windrows on the ground.

As the vehicle travels over the ground during the treating process, the vehicle frame is subjected to various stresses and strains caused by uneven or sloping ground surfaces. These stresses are imparted to the vehicle frame both in lateral and longitudinal directions; that is, in a direction transverse to the travel of the vehicle and in a direction parallel to the travel of the vehicle.

In order to minimize these various stresses and strains, the suspension system of the present invention has been devised for supporting the vehicle frame assembly on the vehicle drive train assemblies.

SUMMARY OF THE INVENTION

The suspension system of the present invention comprises, essentially, a linkage assembly connected between a vehicle drive train assembly and the vehicle frame, on each side of the vehicle frame, whereby the vehicle frame is articulately connected to the vehicle drive train assemblies, and fluid motors are connected between the vehicle frame and each drive train assembly, whereby the position of the vehicle frame relative to the drive train assemblies can be selectively varied, to thereby minimize potential damaging stress imparted to the drive train assemblies by lateral movement of the drive trains relative to the vehicle frame.

A stabilizing link assembly is connected between each drive train assembly and the vehicle frame, whereby potential damaging stress imparted to each drive train assembly by the forward and rearward shifting of the drive train assembly relative to the vehicle frame is minimized.

DESCRIPTION OF THE PREFERRED EMBODIMENT

Figure 1:
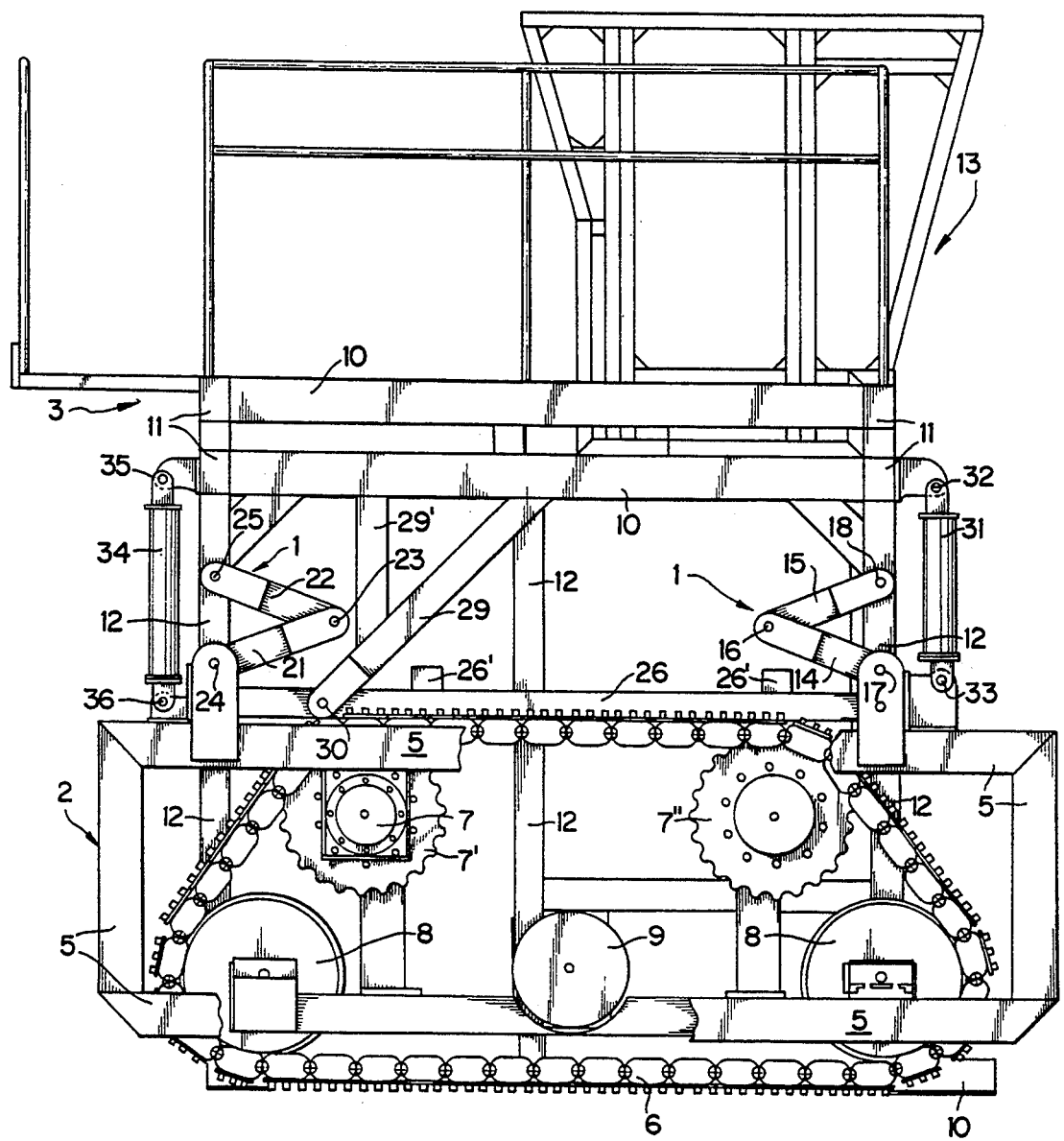
FIG. 1 is a side elevational view of the drive train suspension system of the present invention mounted on a manure and compost treating vehicle, having an endless track as the traction member.
Figure 2:
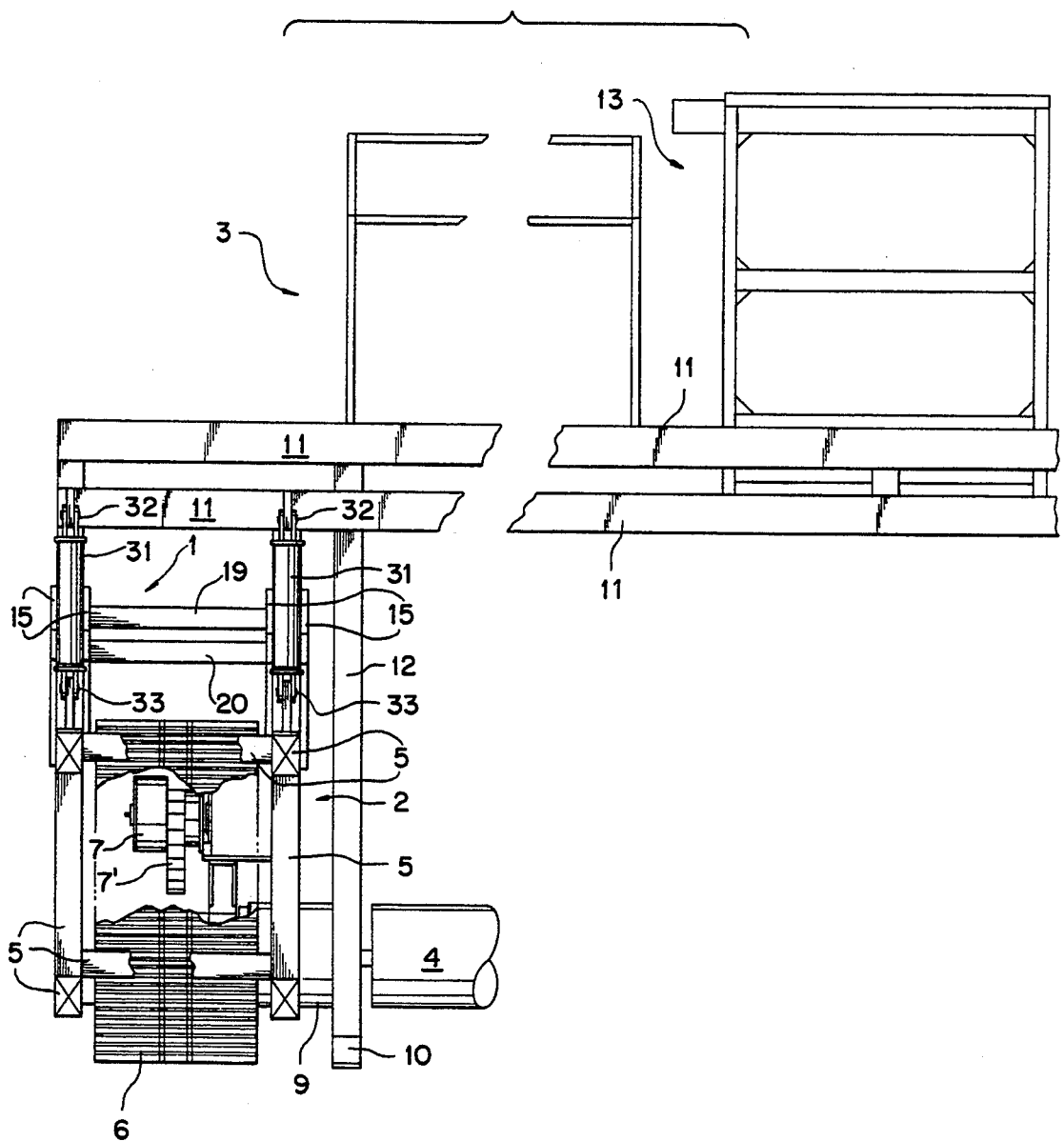
FIG. 2 is a fragmentary, front elevational view of the vehicle shown in FIG. 1, viewed showing the right side of the vehicle frame and associated drive train suspension system.
Figure 3:
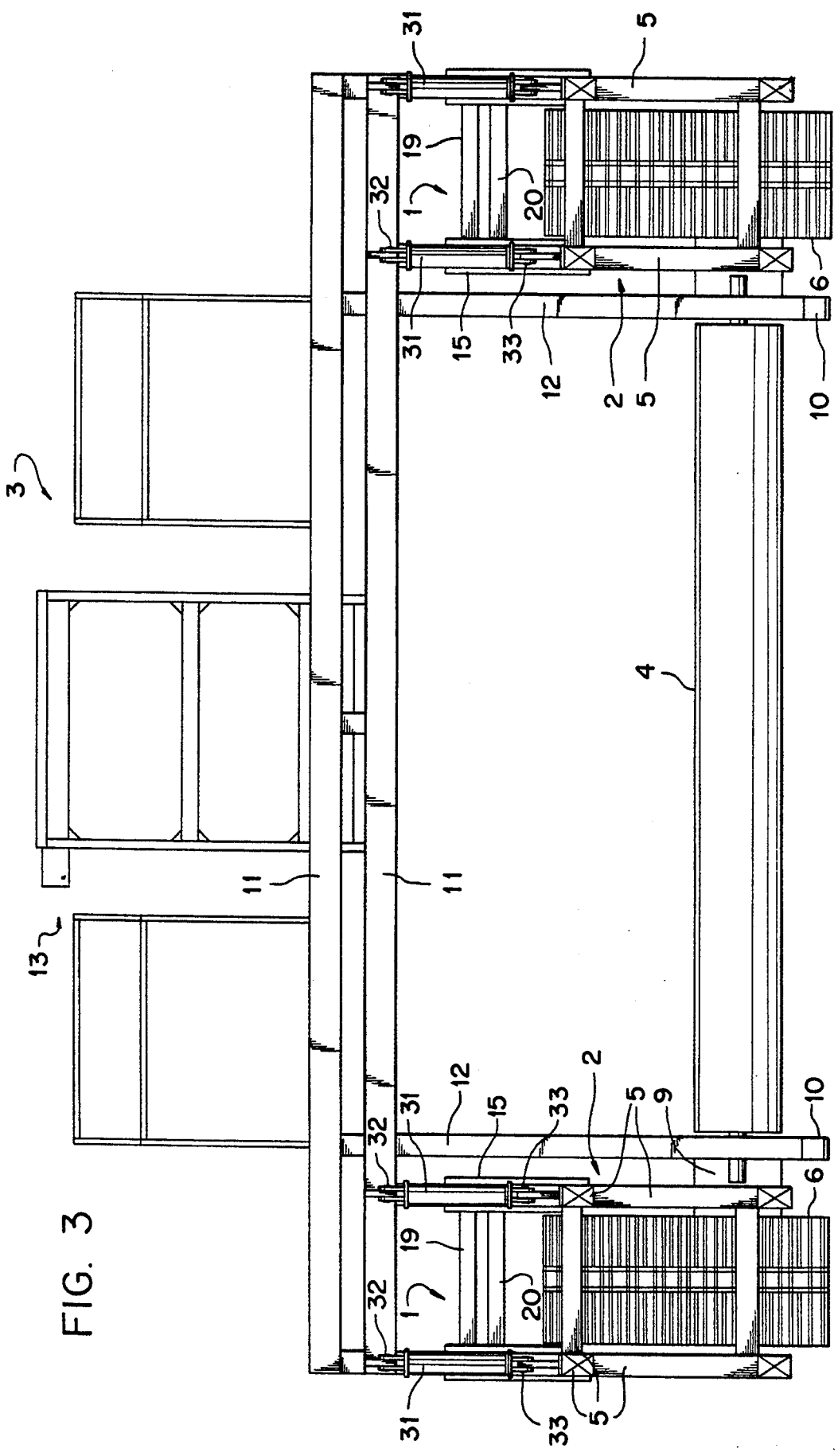
FIG. 3 is a front elevational view of the vehicle shown in FIG. 1.

Referring to the drawings in greater detail, and more particularly to FIGS. 1, 2 and 3, the suspension system 1 of the present invention is mounted on each side of the vehicle between a drive train 2 and the vehicle frame 3 of a manure and compost treating vehicle of the type disclosed in my U.S. Pat. Nos. 4,104,048 and 4,306,686, wherein a rotary drum 4, shown in FIG. 3, having a plurality of flails or blades thereon (not shown), is transversely rotatably mounted on the vehicle frame 3.

Each drive train 2 comprises an open, three-dimensional, box-like framework 5, one of which is positioned on each side of the vehicle frame 3, and within which an endless track 6 and associated hydraulic track drive motor 7, drive sprocket 7', idler sprocket 7'', and idler wheels 8 are mounted for supporting and driving the endless track 6.

The vehicle frame comprises a plurality of longitudinally extending tubular members 10, a plurality of transversely extending tubular members 11, and vertically extending tubular members 12 constructed and arranged to form a welded tubular framework, having two sides and a top portion for supporting the operator's station 13 on top of the vehicle, and providing an open tunnel through the center thereof, across which the rotary drum 4 is rotatably mounted. A drum drive motor 9 is mounted on at least one of the sides of the vehicle frame 3 to rotatably drive rotary drum 4. Drive motor 9 extends from the side of vehicle frame 3 into the open space of framework 5 of drive train 2, whereby up and down movement of drive train 2, to be described, does not interfere with motor 9.

Figure 4:
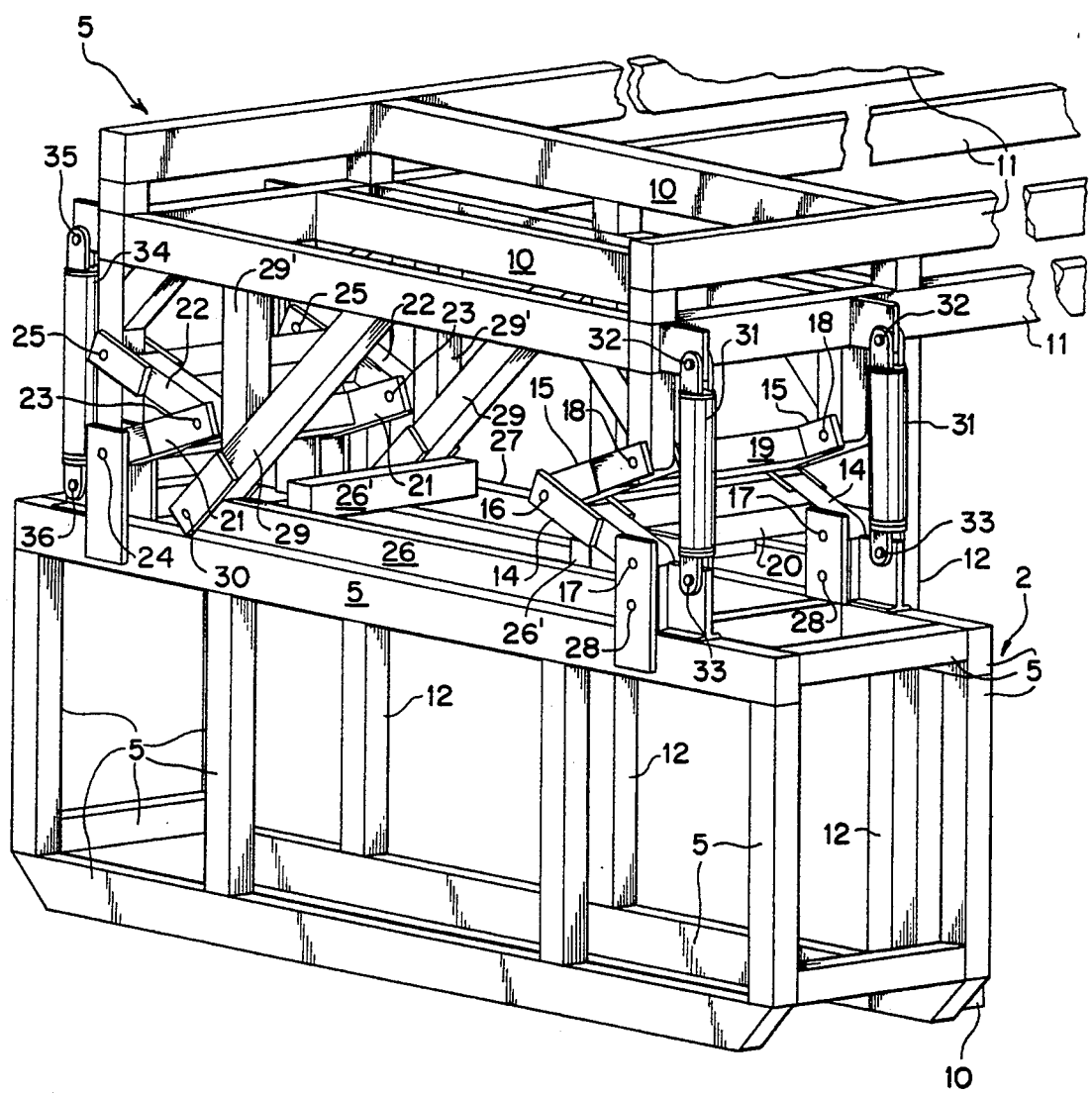
FIG. 4 is a fragmentary, perspective view of the right side of the vehicle frame and associated drive train frame.

As will be seen in FIGS. 1 and 4, the drive train 2 is articulately connected to the vehicle frame 3 by a linkage assembly including two pairs of links 14 and 15 positioned in front of the vehicle and pivotally connected to each other as at 16 to form an elbow joint, and pivotally connected to the drive train open framework 5 as at 17, and to the vehicle frame 3 as at 18. The pairs of links 14 and 15 are interconnected by cross-frames 19 and 20, respectively. Pairs of links 21 and 22 are also included in the linkage assembly and are similarly positioned at the rear of the vehicle and pivotally connected to each other as at 23 to form an elbow joint and are pivotally connected to the open framework 5 as at 24 and to the vehicle frame 3 as at 25.

A stabilizing link assembly is provided between the drive train 2 and vehicle frame 3 and comprises a pair of tubular arms 26, 27 extending along the upper edges of the open framework 5. One end of each arm 26, 27 is pivotally connected to the open framework 5 as at 28, and the other end of each arm 26, 27 is pivotally connected to one end of a respective pair of arms 29 as at 30, the opposite end of each arm 29 being fixedly connected to one of the longitudinally extending frame members 10 of the vehicle frame 3. Cross brace members 26′ are connected between tubular arms 26 and 27, and vertical brace members 29′ are connected between arms 29 and frame members 10, to strengthen the stabilizing link assembly. As the open framework 5 of the drive trains moves up and down, the stabilizing arms 26, 27 pivot about pivot connections 28 and 30, respectively, on the drive trains 2 and the vehicle frame 3. Pivot connections 30 are preferably positioned on the ends of arms 29, beneath the pairs of pivoted links 21, 22, spaced, longitudinally intermediate pivot connections 24, 25 and 23 thereof, and adjacent the top of drive train framework 5, when the drive trains 2 and vehicle frame, through its lowermost longitudinal member 10, are in contact with the ground. The pivot connections 28 for the opposite ends of the arms 26, 27 are preferably in vertical alignment with pivot connections 17, 18 of the front pairs of links 14, 15, and between the lowermost pivot connections 17 and the top of drive train framework 5. This arrangement provides for the longest possible stabilizing arms 26, 27, and the most compact arrangement on the vehicle with the front and rear pivoted articulated links 14, 15 and 21, 22.

In order to lift the vehicle frame 3 off of the ground, and relative to the drive train frame 5, a pair of hydraulic cylinders 31 are positioned at the front of the vehicle and pivotally connected to the vehicle frame 3 as at 32 and to the drive train frame 5 as at 33. A pair of hydraulic cylinders 34 are similarly positioned at the rear of the vehicle and pivotally connected to the vehicle frame as at 35 and to the drive train frame 5 as at 36.

While the details of the construction of the suspension system 1 have been described in connection with the right side of the vehicle it will be understood that the suspension system is duplicated on the left side of the vehicle as shown in FIG. 3. Each suspension system 1 and drive train 2 on opposite sides of the vehicle is separately operable, or they can be operated together.

Figure 5:
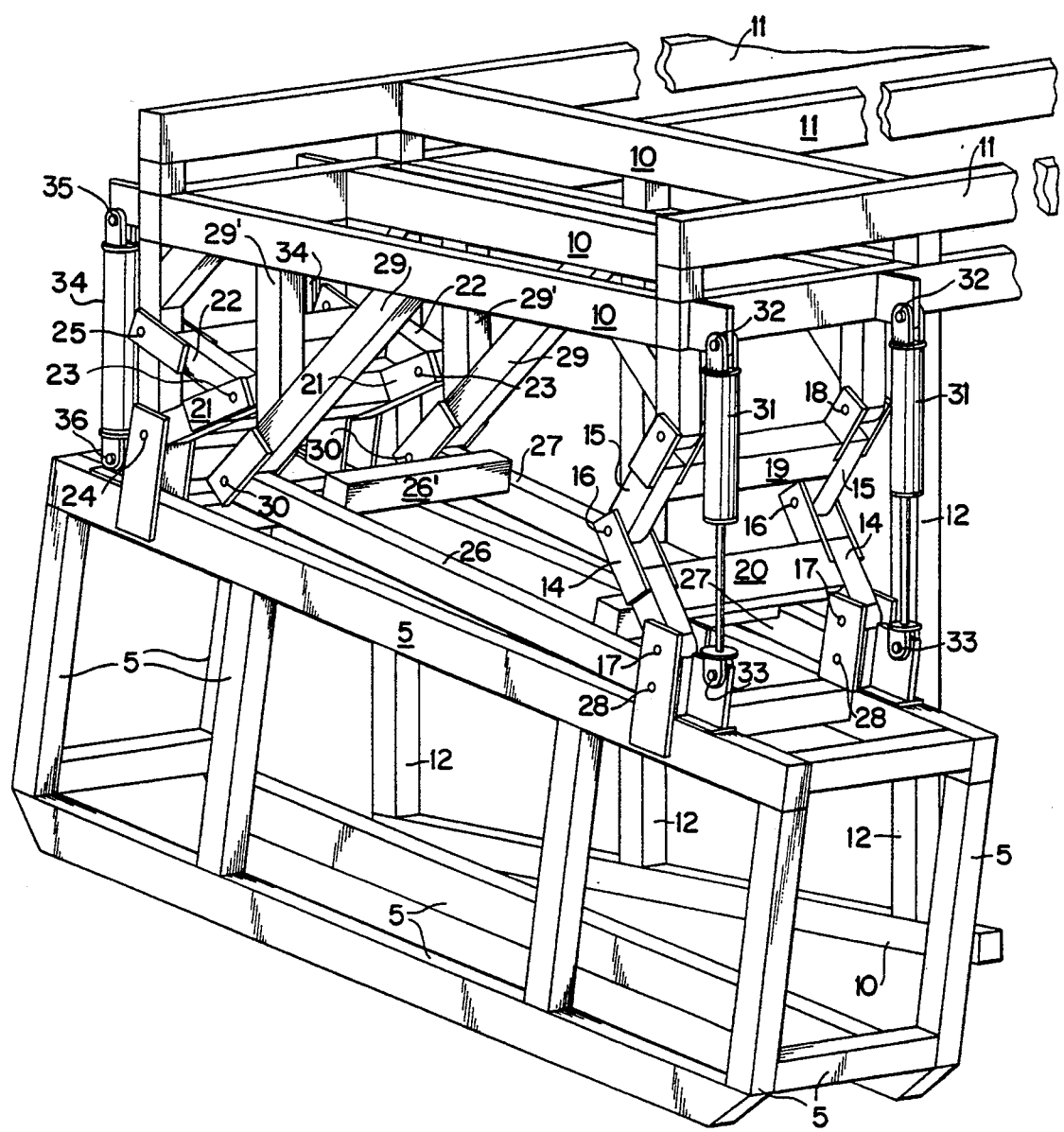
FIG. 5 is a fragmentary, perspective view similar to FIG. 4, but showing the front of the vehicle frame being lifted away from the drive train frame.
Figure 6:
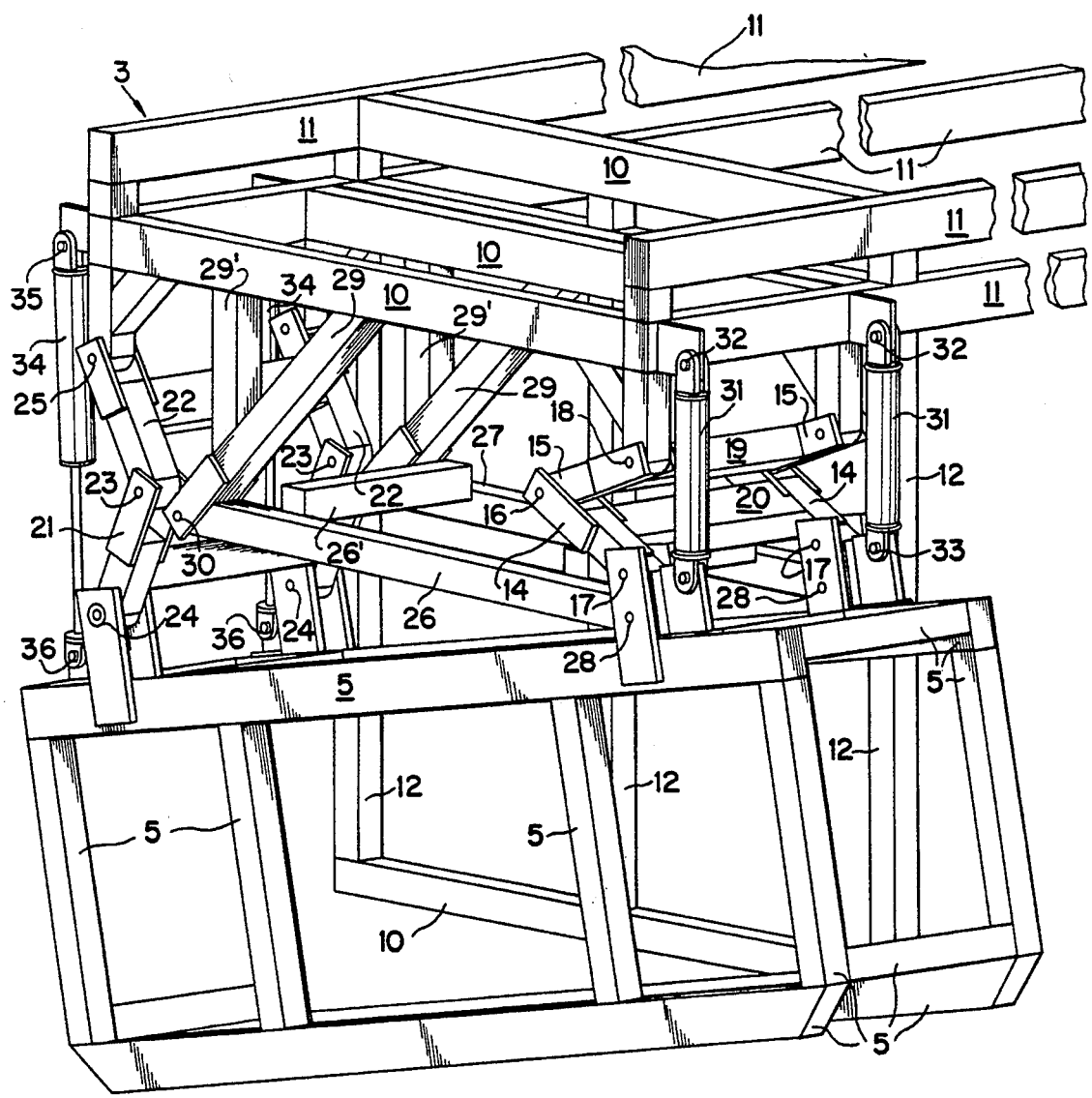
FIG. 6 is a fragmentary, perspective view similar to FIG. 5 but showing the rear of the vehicle frame being lifted away from the drive train frame.

By the construction and arrangement of the suspension system 1, the front and rear of the vehicle frame 3 are independently supported on the drive train frames 2 so that the front of the vehicle frame 3 can be lifted relative to the drive train frame 2, as shown in FIG. 5, by extending the front hydraulic cylinders 31 This lifts the bottom longitudinal member 10 of the vehicle frame 3, from its position in contact with the ground, as shown in FIGS. 1, 2, 3 and 4, upwardly to a selected position above the ground and supported only by the endless track 6 on the drive trains 2. Similarly, the rear of the vehicle frame 3 can be lifted relative to the drive train frames 2, as shown in FIG. 6, by extending the rear hydraulic cylinders 34 and contracting the front hydraulic cylinders 31.

Figure 7:
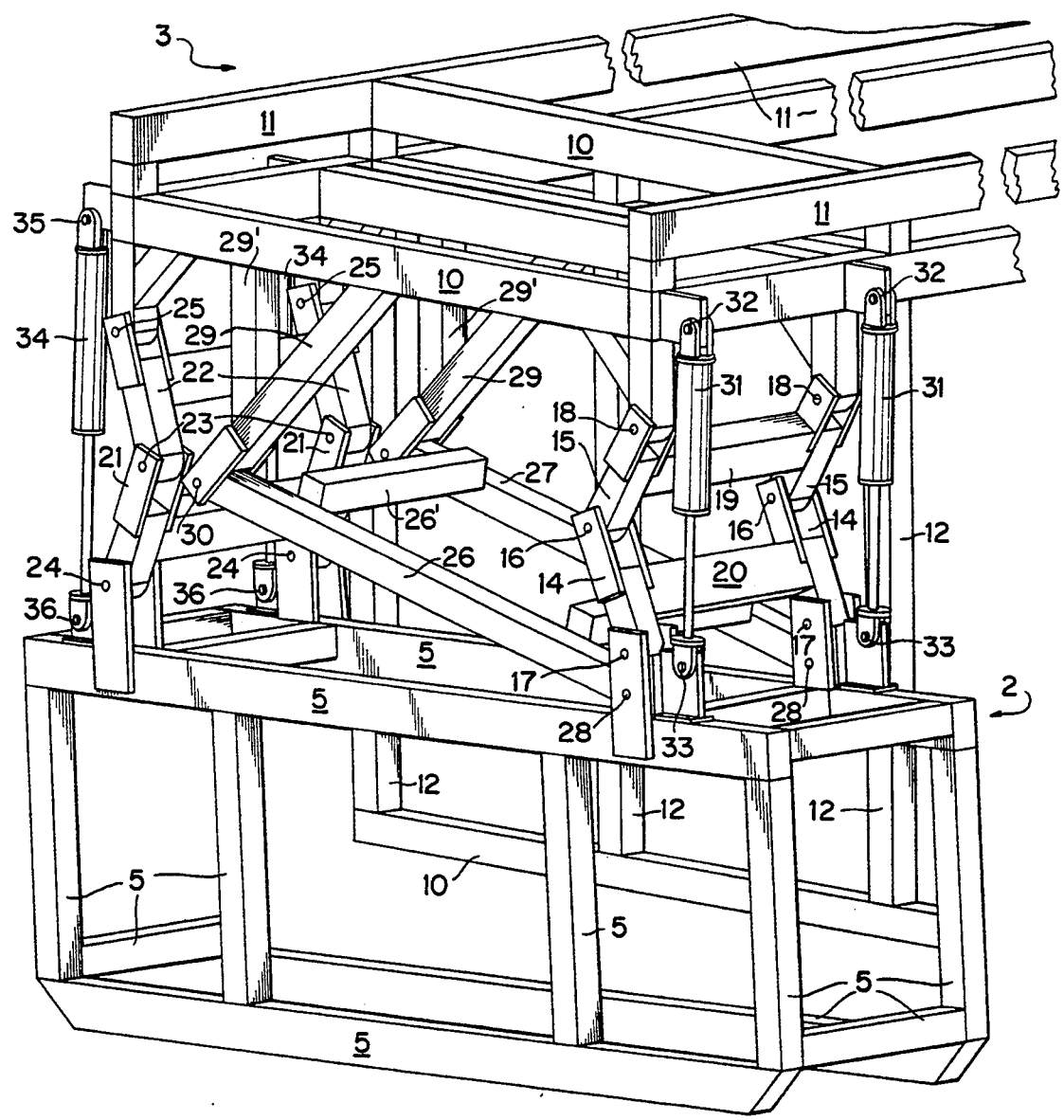
FIG. 7 is a fragmentary, perspective view similar to FIGS. 4, 5 and 6 but showing both the front and rear of the vehicle frame lifted away from the drive train frame.
Figure 8:
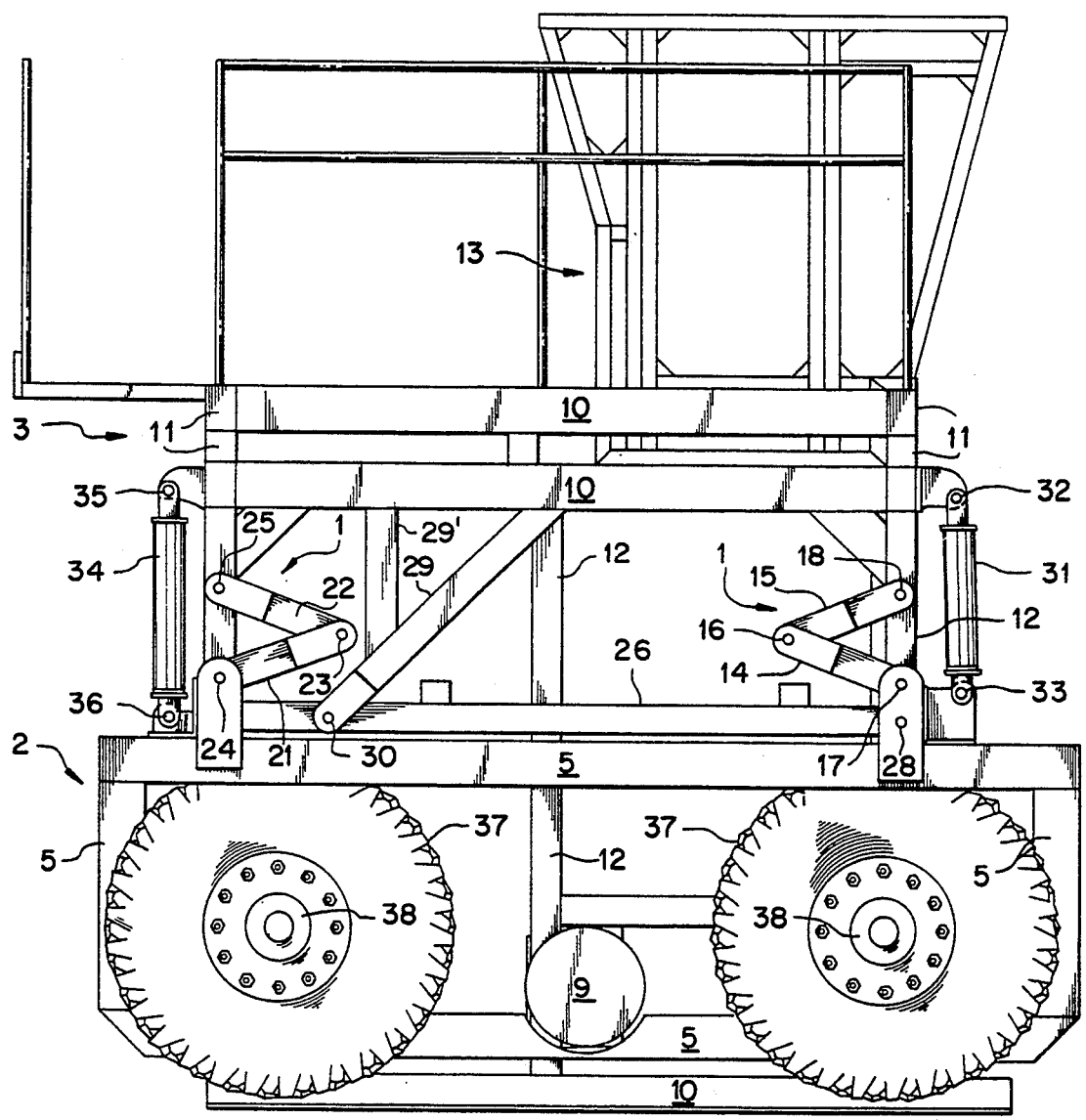
FIG. 8 is a side elevational view of the drive train suspension system of the present invention mounted on a manure and compost treating vehicle having tires as the traction members, with the vehicle frame resting on the ground and the drive train frame and ties raised above the ground.
Figure 9:
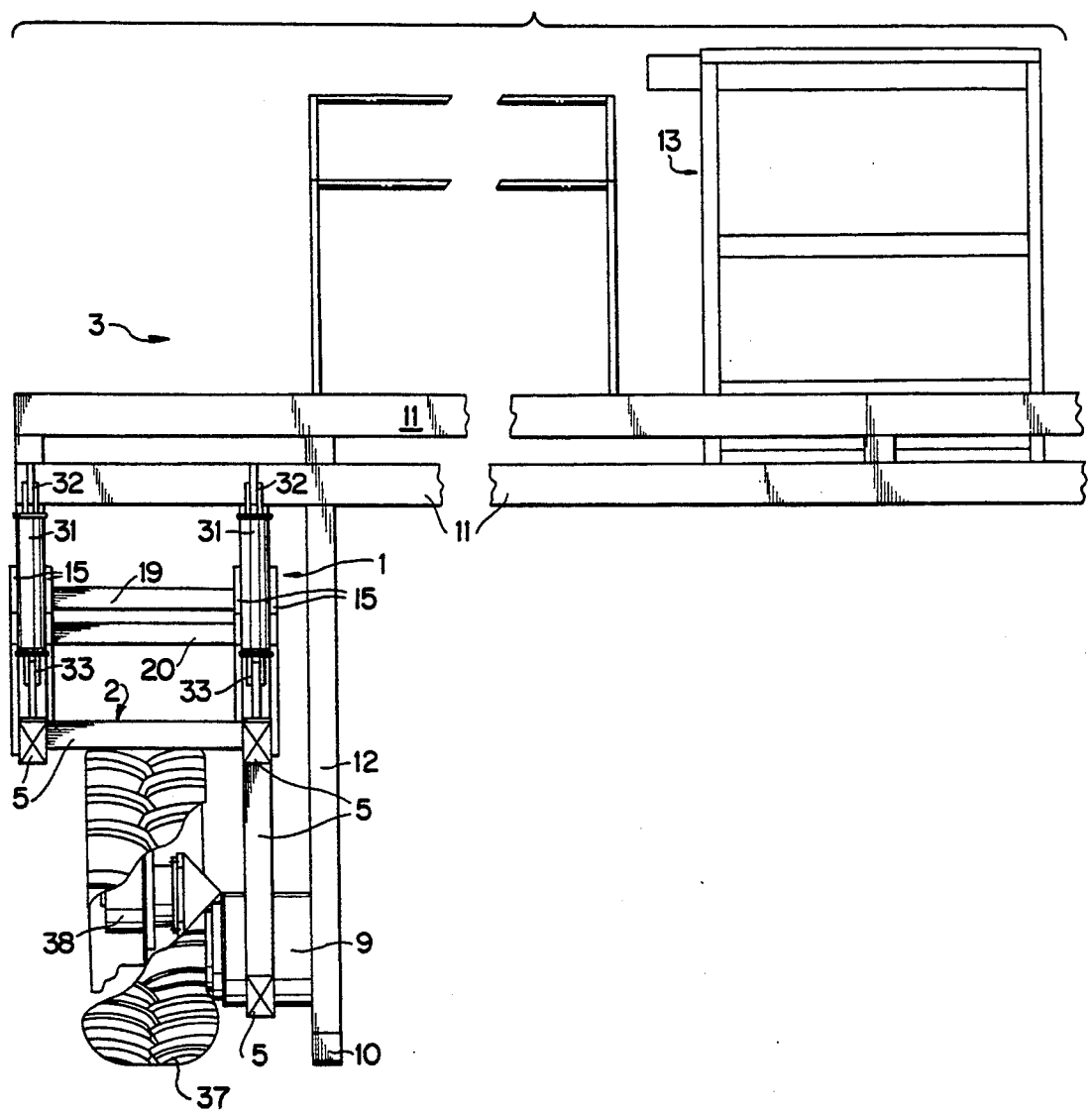
FIG. 9 is a fragmentary, front elevational view of the vehicle shown in FIG. 8, showing the right side of the vehicle frame and associated drive train suspension system.
Figure 10:
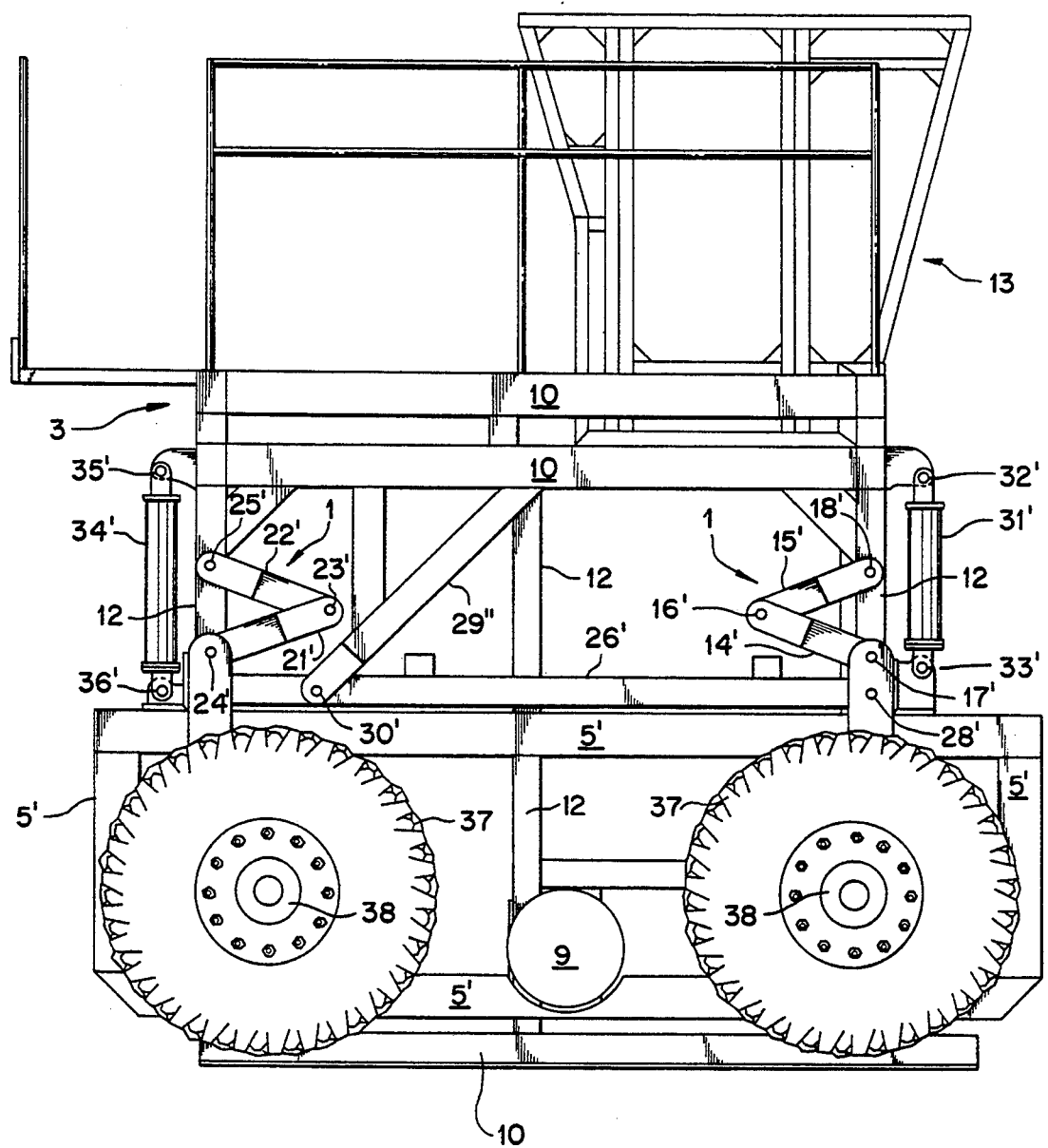
FIG. 10 is a side elevational view similar to FIG. 8, but showing a modified form of drive train frame supporting the tires.
Figure 11:
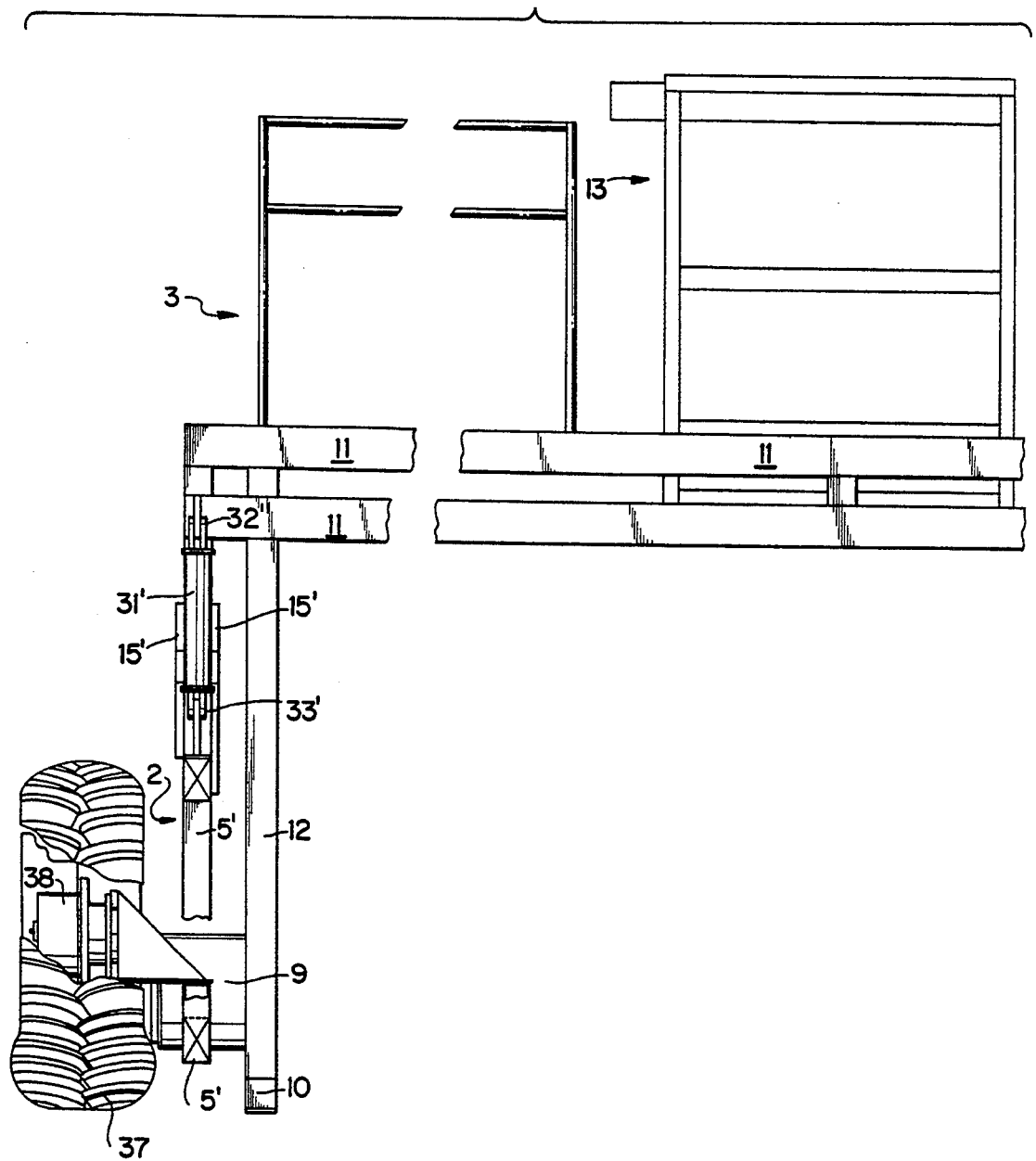
FIG. 11 is a fragmentary, front elevational view of the vehicle shown in FIG. 10 showing the right side of the vehicle frame and associated drive train suspension system.

The right and left sides of the vehicle frame 3 are independently supported on the drive train frames 2, to maintain the vehicle frame 3 level or substantially level, and to support the frame 3 at a selected height above the ground on the tracks 6 of the drive trains 2, no matter what the attitude of the terrain, by extending and/or retracting the hydraulic cylinders 31 and 34 on a respective side, or on both sides. When all cylinders are extended, as shown in FIG. 7, the vehicle frame 3 is raised to a selected elevation above the ground for travel along the ground supported and driven by the ground engaging tracks 6, or the like, on the drive train assemblies 2.

While the vehicle described in connection with FIGS. 1 to 3 employs endless tracks 6 as the traction members, FIGS. 8, 9, 10 and 11 illustrate vehicles employing tandem wheels 37 as the traction members for supporting smaller vehicles, each wheel having a separate hydraulic drive motor 38. While the suspension system 1 is substantially the same as described hereabove, the open frame work 5 for the drive train 2 is modified, as more clearly shown in FIGS. 9 and 11. The duplication of the components in the suspension system 1 is eliminated in the further modified form shown in FIGS. 10 and 11, and the full three-dimensional, open, box-like framework 5 is also eliminated so that the wheels 37 are supported on a drive train assembly 2 comprising a single framework 5′ positioned in a vertical plane in close spaced proximity to the vertical members 12 of the vehicle frame. Corresponding components are indicated by primed numbers.

Figure 12:
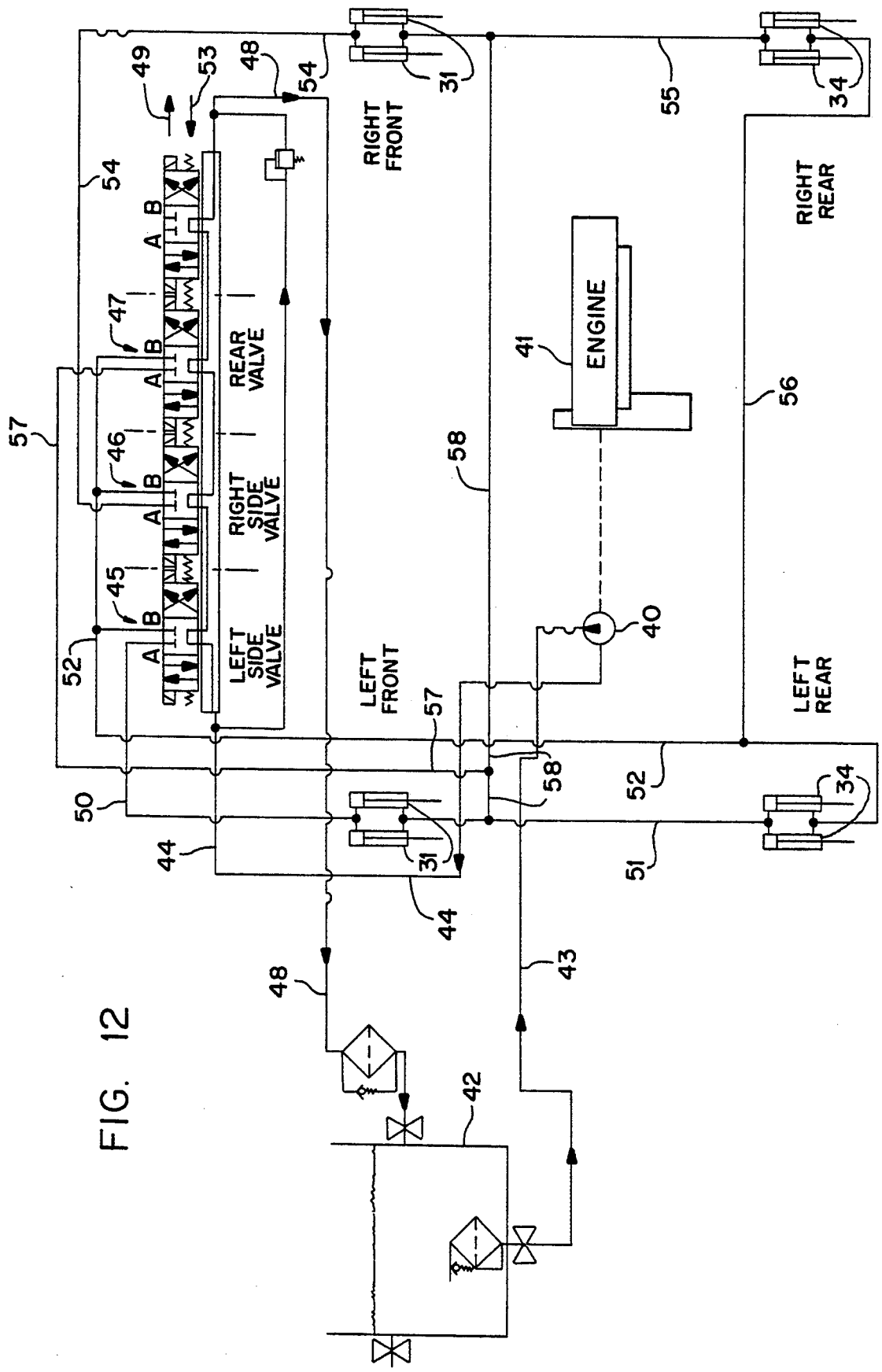
FIG. 12 is a schematic diagram of the hydraulic circuit for actuating the hydraulic motors employed in the drive train suspension system of the present invention.

The hydraulic schematic circuit for actuating the front hydraulic cylinders 31 and the rear hydraulic cylinders 34 is illustrated in FIG. 12 and comprises a pump 40 driven by engine 41 to supply hydraulic fluid from reservoir 42 under pressure via conduits 43 and 44 to a bank of four independently operable two-way hydraulic control valves. Only the first three valves shown schematically at 45, 46 and 47 in their neutral normally blocked condition, are used for actuating the hydraulic cylinders 31 and 34 on the right and left sides of the vehicle. The fourth hydraulic control valve is used for other purposes in the vehicle so the circuit it controls is not shown. The return line 48 from the control valves directs hydraulic fluid back to reservoir 42.

The control valves and hydraulic circuit allow the following operator controlled adjustment of the height of the vehicle frame 3 in relation to the right and left drive train assemblies 2:

1. The left side of the vehicle frame 3 may be raised or lowered independently of the right side of the vehicle frame. This is accomplished by hydraulically extending or retracting the left front and left rear hydraulic cylinders 31 and 34 respectively, on the left side only, to operatively move them from a retracted position as shown in FIG. 4, to an extended position as shown in FIG. 7, or moving them from the shown extended positions to a retracted position to lower the vehicle frame 3 on the left side relative to the left drive train 2.

To raise the left side of the vehicle frame 3 relative to the left drive train 2, left side control valve 45 is moved in the direction of arrow 49 causing hydraulic fluid under pressure from supply conduit 44 to be supplied from port A via conduit 50 to the tops of the parallel connected left front cylinders 31 to extend the piston rods therefrom. The left rear parallel connected cylinders 34 are connected in hydraulic series with the output of left front cylinders 31, and the fluid output from the left front cylinders 34 is directed via conduit 51 to the tops of the left rear cylinders to extend the piston rods therefrom, thus raising the left front and left rear of the vehicle frame 3 simultaneously relative to the left drive train assembly 2. The fluid output from the rod end of left rear cylinders 34 is returned to reservoir 42 via conduit 52, port B of valve 45 and out of the valve to return conduit 48.

To lower the left side of the vehicle frame 3 from a raised position to a position closer to the bottom of the left drive train 2, left side control valve 45 is moved in the direction of arrow 53 directing fluid under pressure from supply conduit 44, through port B of the valve and conduit 52 to the rod ends of left rear cylinders 34, to retract the piston rods. The fluid output from the cylinder ends of cylinder 34 is simultaneously directed via conduit 51 to the rod ends of left front cylinders 31 to retract the piston rods, and the fluid output from the cylinder ends is directed via conduit 50, port A through control valve 45, and via return conduit 48 to reservoir 42.

2. The right side of the vehicle may be raised or lowered independently of the left side. This is accomplished by hydraulically extending or retracting the right front and right rear hydraulic cylinders 31 and 34, respectively, on the right side only, to operatively move them from a retracted position (FIG. 4) to an extended position (FIG. 7), or moving them from the shown extended positions to a retracted position to lower the vehicle frame 3 on the right side relative to the right drive train 2.

To raise the right side of the vehicle frame 3 relative to the right drive train 2, right side control valve 46 is moved in the direction of arrow 49 directing hydraulic fluid under pressure from supply conduit 44, through port A and conduit 54 to the cylinder ends of the parallel connected right front cylinders 31 to extend the piston rods therefrom. The fluid output from the rod ends of these cylinders is directed via conduit 55 to the cylinder ends of the parallel connected right rear cylinders 34 to simultaneously extend the piston rods therefrom, thus raising the right front and right rear of the vehicle frame 3 simultaneously relative to the right drive train 2. The output fluid from the rod ends of right rear cylinders 34 is directed via conduits 56 and 52, through port B of right side control valve 46, to return conduit 48 back to the reservoir 42.

To lower the right side of the vehicle frame 3 from a raised position to a position closer to the bottom of the right drive train 2, right side control valve 46 is moved in the direction of arrow 53 directing fluid under pressure from supply conduit 44, through port B of the valve and conduits 52 and 56 to the rod ends of right rear cylinders 34, to retract the piston rods therein. The fluid output from the cylinder ends of cylinders 34 is directed via conduit 55 to the rod ends of right front cylinders 31 to simultaneously retract the piston rods therein, and the fluid output from the cylinder ends is directed via conduit 54, port A through control valve 46, and via return conduit 48 to the reservoir 42.

3. The rear of the vehicle may be raised or lowered independently of the front of the vehicle. This is accomplished by simultaneously hydraulically extending or retracting only the left rear and right rear hydraulic cylinders 34 to operatively move them from a retracted position, as shown in FIG. 4, to an extended position, as shown in FIG. 6, or moving the cylinders 34 from the shown extended position to a retracted position to lower the entire rear of the vehicle frame 3 relative to the left and right drive trains 2.

To raise the rear of the vehicle frame 3, relative to the rear of the left and right drive trains 2, such as to keep the vehicle frame 3 substantially level when the drive trains 2 are travelling up an incline, rear control valve 47 is moved in the direction of arrow 49 directing hydraulic fluid under pressure from supply conduit 44, through port A and conduits 57, 58, 51 and 55 to the cylinder ends of left rear cylinders 34 and right rear cylinders 34 to simultaneously extend the piston rods therefrom thus raising the entire rear of the vehicle frame 3 relative to the left and right drive trains 2, as indicated in FIG. 6. The fluid output from the rod ends of all the cylinders 34 is directed via conduits 56 and 52, through port B of rear control valve 47 to return conduit 48 back to the reservoir 42.

To lower the rear of the vehicle frame 3 from a raise position to a position closer to the bottom of the left and right drive trains 2, rear control valve 47 is moved in the direction of arrow 53 directing fluid under pressure from supply conduit 44, through port B of the valve and conduits 52, and 56 to the rod ends of left rear cylinders 34 and right rear cylinders 34, to retract the piston rods therein. The output fluid from the cylinder ends of all the cylinders 34 is directed via conduits 51, 55, 58 and 57, port A through control valve 47, and via return conduit 48 to the reservoir 42.

It will be understood by one skilled in the art that by operating a combination of the control valves 45, 46 and 47 the vehicle frame 3 can be adjusted to a variety of positions relative to the right and left power trains 2, depending upon the slope of the terrain being transversed by the tracks 6 or wheels 37 of the power trains 2, to maintain the top of the frame and the operator's cab substantially level.

From the above description it will be readily appreciated by those skilled in the art that by the construction and arrangement of the suspension system 1 of the present invention, the operating height of the vehicle's frame 3 can be adjusted relative to the drive trains 2 and the linkage assemblies 21, 22, 21', 22' and associated rear hydraulic cylinders 34, 34' are designed to provide independent rear suspension, thereby minimizing the structural stress or twisting which could result from operating the vehicle on an uneven surface. This is accomplished through the ability of each rear link 21, 22, 21', 22', to pivot independently of the other three links. The degree of pivoting of the rear links 21, 22, 21', 22' permitted for the purpose of independent rear suspension is determined by the amount of hydraulic pressure transferred to the rear hydraulic cylinders 34, 34'.

Potentially damaging lateral movement of the drive trains 2 in relation to the vehicle frame 3, that is, the tendency of the drive trains to pull horizontally away from the center of the vehicle frame 3 or push horizontally toward the center of the vehicle frame 3, can occur either when one side of the vehicle frame 3 is raised or lowered in relation to the respective drive train 2 on that side, when the vehicle is operated on an uneven surface, or when the vehicle changes direction. Such lateral movement can weaken, twist and/or damage the drive train mechanism or the suspension structure 1, including the hydraulic cylinders, through which the drive train 2 is attached to the vehicle frame 3. The design and construction of the front and rear dual links 14, 15, 21, 22, and single links 14', 15', 21', 22', greatly minimizes or eliminates the potential damaging lateral movement of the drive trains 2 relative to the vehicle frame 3.

Potentially damaging forward or rearward shifting of the drive trains 2 relative to the vehicle frame 3 can occur either when the vehicle is operated on an uneven surface or when the vehicle changes direction. As noted above in connection with lateral movement, such forward and rearward shifting can weaken, twist and/or damage the drive train mechanism or structure through which the drive train 2 is connected to the vehicle frame 3. The sturdy and stable construction and arrangement of the stabilizing link assembly 26, 29, and 26', 29", is such that potentially damaging forward and/or rearward shifting of the drive trains 2 in relation to the vehicle frame 3 is minimized or eliminated.

The terms and expression which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A drive train suspension system for a vehicle comprising, a vehicle drive train assembly the vehicle drive train assembly comprising, an open framework positioned on each side of the vehicle, an endless track and associated drive sprockets and idler wheels mounted in said open framework, a vehicle frame, a linkage assembly connected between the vehicle drive train assembly and the vehicle frame, whereby the vehicle frame is articulately connected to the vehicle drive train assembly, fluid motors connected between the vehicle frame and drive train assembly, whereby the position of the vehicle frame relative to the drive train assembly can be varied, to thereby minimize potential damaging stress imparted to the drive train assembly by lateral movement of the drive train relative to the vehicle frame, and a stabilizing link assembly connected between the drive train assembly and vehicle frame, whereby potential damaging stress imparted to the drive train assembly by the forward and rearward shifting of the drive train assembly relative to the vehicle frame is minimized.

2. A drive train suspension according to claim 1, wherein the vehicle frame comprises a plurality of longitudinally extending tubular members, a plurality of transversely extending tubular members and vertically extending tubular members constructed and arranged to form a welded tubular frame work.

3. A drive train suspension according to claim 1, wherein the linkage assembly comprises at least one pair of links positioned in the front portion of the vehicle and at least one pair of links positioned at the rear portion of the vehicle, each link in each pair being pivotally connected at one end to each other to form an elbow joint, the opposite ends of each link in each pair being respectively pivotally connected to the drive train assembly and the vehicle frame.

4. A drive train suspension according to claim 3, wherein the elbow joint at the rear portion of the vehicle extends in a direction toward the front of the vehicle, and the elbow joint at the front portion of the vehicle extends in a direction toward the rear of the vehicle.

5. A drive train suspension system according to claim 1, wherein the stabilizing link assembly comprises an arm extending longitudinally on the upper edge portion of the framework, an arm member, one end of the longitudinally extending arm being pivotally connected to the upper edge portion of the open framework, the opposite end of said longitudinally extending arm being pivotally connected to said arm member, and the opposite end of said arm member being fixedly connected to the vehicle frame.

6. A drive train suspension system according to claim 5, wherein the linkage assembly comprises at least one pair of links positioned in the front portion of the vehicle and at least one pair of links positioned at the rear portion of the vehicle, each link in each pair being pivotally connected at one end to each other to form an elbow joint, the opposite ends of each link in each pair being respectively pivotally connected to the drive train assembly and the vehicle frame, and said elbow joint at the rear portion of the vehicle positioned above the pivot connection of said longitudinally extending arm to said arm member.

7. A drive train suspension system according to claim 6, in which the pivot connection of such longitudinally extending arm to the upper edge portion of the open framework is positioned below the pivot connections of the pair of links in the front portion of the vehicle to the drive train and the vehicle frame.

8. A drive train suspension system as set forth in claim 5, in which said arm member is an inclined arm member.

9. A drive train suspension system according to claim 1, wherein the vehicle is a manure and compost treating vehicle.

10. A drive train suspension system for a vehicle comprising, a vehicle drive train assembly, the vehicle drive train assembly comprising, an open framework positioned on each side of the vehicle, and tandem drive wheels mounted in said framework, a vehicle frame, a linkage assembly connected between the vehicle drive train assembly and the vehicle frame, whereby the vehicle frame is articulately connected to the vehicle drive train assembly, fluid motors connected between the vehicle frame and drive train assembly, whereby the position of the vehicle frame relative to the drive train assembly can be varied, to thereby minimize potential damaging stress imparted to the drive train assembly by lateral movement of the drive train relative to the vehicle frame, and a stabilizing link assembly connected between the drive train assembly and vehicle frame, whereby potential damaging stress imparted to the drive train assembly by the forward and rearward shifting of the drive train assembly relative to the vehicle frame is minimized.

11. A drive train suspension system according to claim 10, wherein the stabilizing link assembly comprises an arm extending longitudinally on the upper edge portion of the framework, an arm member, one end of the longitudinally extending arm being pivotally connected to the upper edge portion of the open framework, the opposite end of said longitudinally extending arm being pivotally connected to said arm member, and the opposite end of said arm member being fixedly connected to the vehicle frame.

12. A drive train suspension system according to claim 11, wherein the linkage assembly comprises at least one pair of links positioned in the front portion of the vehicle and at least one pair of links positioned at the rear portion of the vehicle, each link in each pair being pivotally connected at one end to each other to form an elbow joint, the opposite ends of each link in each pair being respectively pivotally connected to the drive train assembly and the vehicle frame, and said elbow joint at the rear portion of the vehicle positioned above the pivot connection of said longitudinally extending arm to said arm member.

13. A drive train suspension system according to claim 12, in which the pivot connection of such longitudinally extending arm to the upper edge portion of the open framework is positioned below the pivot connections of the pair of links in the front portion of the vehicle to the drive train and the vehicle frame.

14. A drive train suspension system as set forth in claim 11, in which said arm member is an inclined arm member.

15. A drive train suspension according to claim 10, wherein the vehicle frame comprises a plurality of longitudinally extending tubular members, a plurality of transversely extending tubular members and vertically extending tubular members constructed and arranged to form a welded tubular frame work.

16. A drive train suspension according to claim 10, wherein the linkage assembly comprises at least one pair of links positioned in the front portion of the vehicle and at least one pair of links positioned at the rear portion of the vehicle, each link in each pair being pivotally connected at one end to each other to form an elbow joint, the opposite ends of each link in each pair being respectively pivotally connected to the drive train assembly and the vehicle frame.

17. A drive train suspension according to claim 16, wherein the elbow joint at the rear portion of the vehicle extends in a direction toward the front of the vehicle, and the elbow joint at the front portion of the vehicle extends in a direction toward the rear of the vehicle.

18. A drive train suspension system according to claim 10, wherein the vehicle is a manure and compost treating vehicle.

19. A drive train suspension system for a vehicle comprising, a vehicle drive train assembly, said vehicle drive train assembly including an open framework positioned on each side of the vehicle and each having an upper edge portion, traction means mounted in said framework, a vehicle frame, a linkage assembly connected between the vehicle drive train assembly and the vehicle frame, said linkage assembly comprising at least one pair of links positioned in the front portion of the vehicle and at least one pair of links positioned at the rear portion of the vehicle, each link in each pair being pivotally connected at one end to each other to form an elbow joint, the elbow joint at the rear portion of the vehicle extending in a direction toward the front of the vehicle, and the elbow joint at the front portion of the vehicle extending in a direction toward the rear of the vehicle, the opposite ends of each link in each pair being respectively pivotally connected to the drive train assembly and the vehicle frame, whereby the vehicle frame is articulately connected to the vehicle drive train assembly, fluid motors connected between the vehicle frame and drive train assembly, whereby the position of the vehicle frame relative to the drive train assembly can be varied, to thereby minimize potential damaging stress imparted to the drive train assembly by lateral movement of the drive train relative to the vehicle frame, and a stabilizing link assembly connected between the drive train assembly and vehicle frame, said stabilizing link assembly comprising an arm extending longitudinally on the upper edge portion of the framework, an arm member, one end of the longitudinally extending arm being pivotally connected to the upper edge portion of the open framework, the opposite end of said longitudinally extending arm being pivotally connected to said arm member, and the opposite end of said arm member being fixedly connected to the vehicle frame, whereby potential damaging stress imparted to the drive train assembly by the forward and rearward shifting of the drive train assembly relative to the vehicle frame is minimized.

20. A drive train suspension system according to claim 19, in which the pivot connection of said longitudinally extending arm to said arm member is positioned below said elbow joint at the rear portion of the vehicle.

21. A drive train suspension system according to claim 10, in which the pivot connection of said longitudinally extending arm to said arm member is positioned intermediate said elbow joint at the rear portion of the vehicle and said pivotal connection of said link of said elbow joint at the rear portion to said drive train assembly.

22. A drive train suspension system according to claim 19, in which the pivot connection of longitudinally extending arm to the upper edge portion of the open framework is positioned below the pivot connections of the pair of links in the front portion of the vehicle to the drive train and the vehicle frame.

23. A drive train suspension system according to claim 19, wherein the vehicle is manure and compost treating machine.

24. A drive train suspension system for a vehicle comprising, a vehicle drive train assembly, the vehicle drive train assembly comprising, an open framework positioned on each side of the vehicle, and traction means and associated drive means for said traction means mounted in said open framework, a vehicle frame, a linkage assembly connected between the vehicle drive train assembly and the vehicle frame, whereby the vehicle frame is articulately connected to the vehicle drive train assembly, fluid motors connected between the vehicle frame and drive train assembly, whereby the position of the vehicle frame relative to the drive train assembly can be varied, to thereby minimize potential damaging stress imparted to the drive train assembly be by lateral movement of the drive train relative to the vehicle frame, and a stabilizing link assembly connected between the drive train assembly and vehicle frame, whereby potential damaging stress imparted to the drive train assembly by the forward and rearward shifting of the drive train assembly relative to the vehicle frame is minimized.

* * * * *